(12) United States Patent
Fernandez Michel

(10) Patent No.: US 9,243,937 B2
(45) Date of Patent: Jan. 26, 2016

(54) GAUGE HAVING VARIABLE DISPLAY

(71) Applicant: Continental Automotive Systems, Inc., Auburn Hills, MI (US)

(72) Inventor: Marcela Fernandez Michel, Zapopan (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 280 days.

(21) Appl. No.: 13/912,706

(22) Filed: Jun. 7, 2013

(65) Prior Publication Data

US 2014/0360423 A1    Dec. 11, 2014

(51) Int. Cl.
| | | |
|---|---|---|
| *G01D 11/28* | (2006.01) | |
| *G01D 13/02* | (2006.01) | |
| *G01D 13/12* | (2006.01) | |
| *G01D 13/04* | (2006.01) | |

(52) U.S. Cl.
CPC .......... *G01D 13/04* (2013.01); *B60K 2350/408* (2013.01); *G01D 11/28* (2013.01)

(58) Field of Classification Search
CPC ....... G01D 11/28; G01D 13/00; G01D 13/02; G01D 3/04; G01D 13/12; G01D 13/22
USPC .......... 116/62.1, 62.4, 286, 287, 288, DIG. 6, 116/DIG. 36; 362/23.12, 23.13, 23.14, 362/23.19, 23.2, 23.21
See application file for complete search history.

(56) References Cited

U.S. PATENT DOCUMENTS

| | | | | | |
|---|---|---|---|---|---|
| 3,997,777 | A | * | 12/1976 | Pucciarello | 362/23.01 |
| 4,872,093 | A | * | 10/1989 | Shimizu | 362/23.15 |
| 4,872,415 | A | * | 10/1989 | Nakadozono et al. | 116/288 |
| 6,379,015 | B2 | * | 4/2002 | Wilhelm et al. | 362/23.2 |
| 6,408,784 | B1 | * | 6/2002 | Ross | 116/288 |
| 7,066,630 | B1 | * | 6/2006 | Venkatram | 362/489 |
| 7,549,390 | B2 | * | 6/2009 | Verdouw | 116/288 |
| 7,810,445 | B2 | * | 10/2010 | Krishnamurthy | 116/288 |
| 2008/0002386 | A1 | * | 1/2008 | Mezouari | 362/27 |
| 2015/0103509 | A1 | * | 4/2015 | Sato et al. | 362/23.14 |

FOREIGN PATENT DOCUMENTS

| | | | | | |
|---|---|---|---|---|---|
| EP | 939301 | A1 | * | 9/1999 | G01D 11/28 |
| JP | 05248896 | A | * | 9/1993 | G01D 11/28 |
| JP | 2000186947 | A | * | 7/2000 | G01D 11/28 |
| JP | 2008309726 | A | * | 12/2008 | G01D 11/28 |
| JP | 2012032192 | A | * | 2/2012 | G01D 11/28 |

* cited by examiner

*Primary Examiner* — R. A. Smith

(57) ABSTRACT

A gauge which uses a prism or other type of reflector to illuminate a single graphic or icon on a dial such that only one graphic on the dial is shown during the operation of the gauge. All of the remaining graphics have a dead front appearance, and cannot be viewed, such that the gauge presents only one discrete value at a time. The dial is beneath a lens, and the prism is beneath the dial. An actuator is mounted to a PCB, and an LED is also mounted to the PCB to allow the prism to transmit light to the desired area of the dial. The dial also includes a central graphic, or icon, and the gauge is able to display different values, while the central graphic remains constantly illuminated in the center of the gauge.

12 Claims, 4 Drawing Sheets

GAUGE HAVING VARIABLE DISPLAY

FIELD OF THE INVENTION

The invention relates generally to a gauge having a dial with several graphics, where only one of the graphics is illuminated at a time, while the remainder of the graphics have a dead front appearance.

BACKGROUND OF THE INVENTION

Gauges are commonly used in different applications to convey information to a driver about various operating conditions of a vehicle. Several gauges may be included as part of an instrument cluster to provide information to the driver relating to vehicle speed, engine speed, amount of fuel used, engine temperature, fuel economy, and the like. Gauges are also used for applications other than for automotive use, such as air compressors, boilers, and the like. When used in a vehicle, typical gauges receive information from a device such as the vehicle's electronic control unit (ECU). These gauges include a pointer which rotates and aligns with various portions of a scale, and the pointer moves to various locations along the scale, depending upon the information received from the ECU.

However, most of these types of gauges have a pointer that is in front of the scale, and the pointer rotates about an axis. The pointer typically is mounted near the center of the gauge, and extends outwardly, overlapping with part of the scale. The pointer is calibrated to properly align with the portion of the scale when the gauge is viewed substantially perpendicularly. The reading provided by the gauge may have a margin of error when viewed from various angles. Also, the pointer takes up space on the front of the gauge, which limits the amount of information that may be displayed on the scale.

Accordingly, there exists a need for a gauge which is viewable from different angles, provides an accurate reading, and improves the reading of the scale.

SUMMARY OF THE INVENTION

The present invention provides a gauge which uses a prism or other type of reflector to illuminate a single graphic on a dial such that only one graphic on the dial is shown during the operation of the gauge. All of the remaining graphics have a "dead front" appearance, and are not visible. In one embodiment, the present invention is a pointerless gauge having a housing, a printed circuit board (PCB) mounted within the housing, an actuator mounted to the PCB, and a shaft extending through the actuator. A light emitting diode (LED) is mounted on the PCB in proximity to the shaft, such that light passes through the shaft when the LED is activated. A tube portion is mounted on an end of the shaft, a prism connected to the tube portion, and a dial is mounted in the housing in proximity to the prism. A plurality of graphics is located on the dial, and each of the plurality of graphics represents a measurement of an operating parameter. A lens is mounted in the housing in proximity to the dial such that the lens is on the opposite side of the dial in relation to the prism.

The actuator rotates the shaft to position the prism in proximity to one of the plurality of graphics representing a measurement of the operating parameter, and light emitted from the LED passes through the shaft and is directed through one of the plurality of graphics by the prism.

Instead of having a pointer which moves through the use of a mechanical device towards one of several values always displayed on a scale, the gauge of the present invention presents only one discrete value at a time. The dial is behind the lens, and the prism is behind the dial. In one embodiment, the actuator is a stepper motor located on top of the PCB, and the LED is placed below the shaft of the stepper motor so the prism transmits the light to the desired area of the dial. The dial also includes a central graphic, or icon which may vary depending upon the type of application for which the gauge is used. The gauge is able to display different values, while the icon remains constantly illuminated in the center of the gauge.

Beneath the dial, a prism (or in alternate embodiment, a reflector) is moved by the shaft of the gauge. The shaft rotates the prism to place the prism under the graphic representing the desired value of the dial, illuminating only that graphic and making it visible to the user. Also, the prism continuously illuminates a graphic located in the center of the dial. This invention is applicable to any of the gauges in an instrument cluster, or other applications.

One of the advantages of the gauge of the present invention is that there is more space in the dial, which provides a cleaner design and improved viewing of the gauge. The dial being located closer to the lens improves its visibility from different viewing angles. The gauge of the present invention also has a reduced number of parts compared to typical gauges, reducing the cost. Furthermore, the gauge of the present invention is shorter in length than typical gauges, allowing the gauge of the present invention to meet more stringent packaging requirements.

In alternate embodiments, the prism or reflector may be different shapes, providing illumination of the values of the dial with LEDs. Additionally, illumination of the values of the dial may be achieved with a light beam form a different light source or a display.

In other alternate embodiments, the actuator may be mounted on different sides of the PCB, such as either the top or the bottom side, and still perform the functions as described above. When the actuator is mounted on the bottom side of the PCB, light from the LED passes directly into the tube portion, instead of passing through the shaft.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

An embodiment of a gauge according to the present invention is shown in FIGS. 1-4, generally at 10. The gauge 10 includes a housing 12 having an outer sidewall 14. Formed as part of the sidewall 14 is a ledge portion 16, and mounted on the ledge portion 16 is a printed circuit board (PCB) 18. Mounted on the PCB 18 is various circuitry necessary for the operation of the gauge 10, as well as an actuator, shown generally at 20, which in this embodiment is a stepper motor. However, it is within the scope of the invention that other types of actuators may be used.

Figure 3:
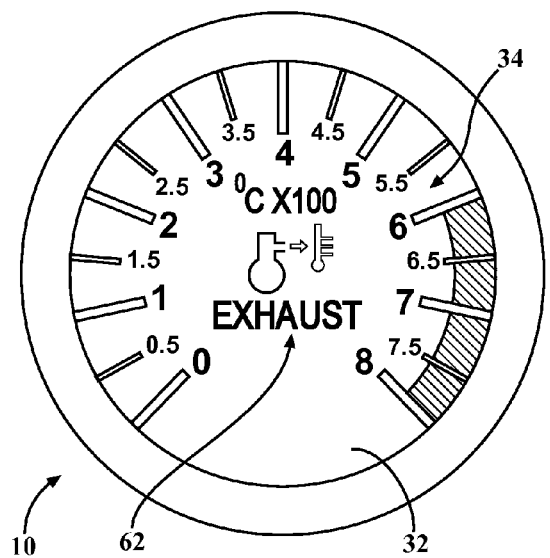
FIG. 3 is a third front view of a gauge, with all of the graphics visible, according to embodiments of the present invention.
Figure 4:
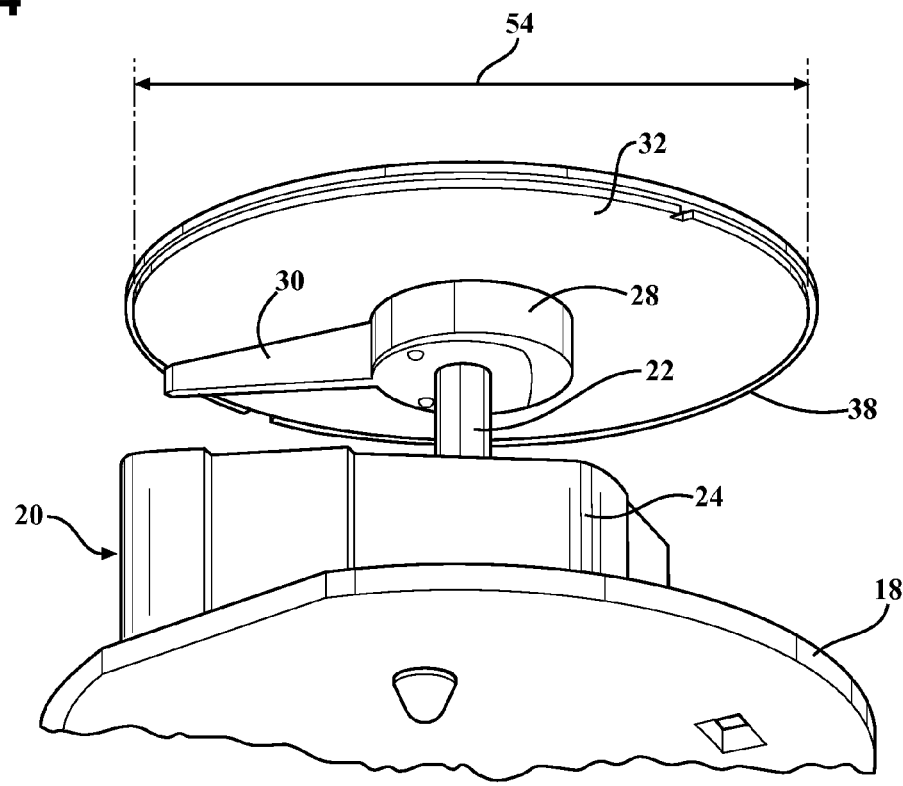
FIG. 4 is a perspective view of a gauge with the housing removed, according to embodiments of the present invention.

The stepper motor 20 includes various components which are used for rotating a shaft 22, and the shaft 22 protrudes outwardly away from the stepper motor housing 24. Mounted on an end 26 of the shaft 22 is a tube portion 28, and connected to the tube portion 28 is a light directing device, which in this embodiment is a prism 30. The prism 30 is rotated by the shaft 22, and the stepper motor 20 rotates the shaft 22. The prism 30 is located in proximity to a dial 32, and the dial 32 has various graphics, or icons, 34 which provide an indication of various ranges of operating conditions, as shown in FIG. 3.

Figure 1:
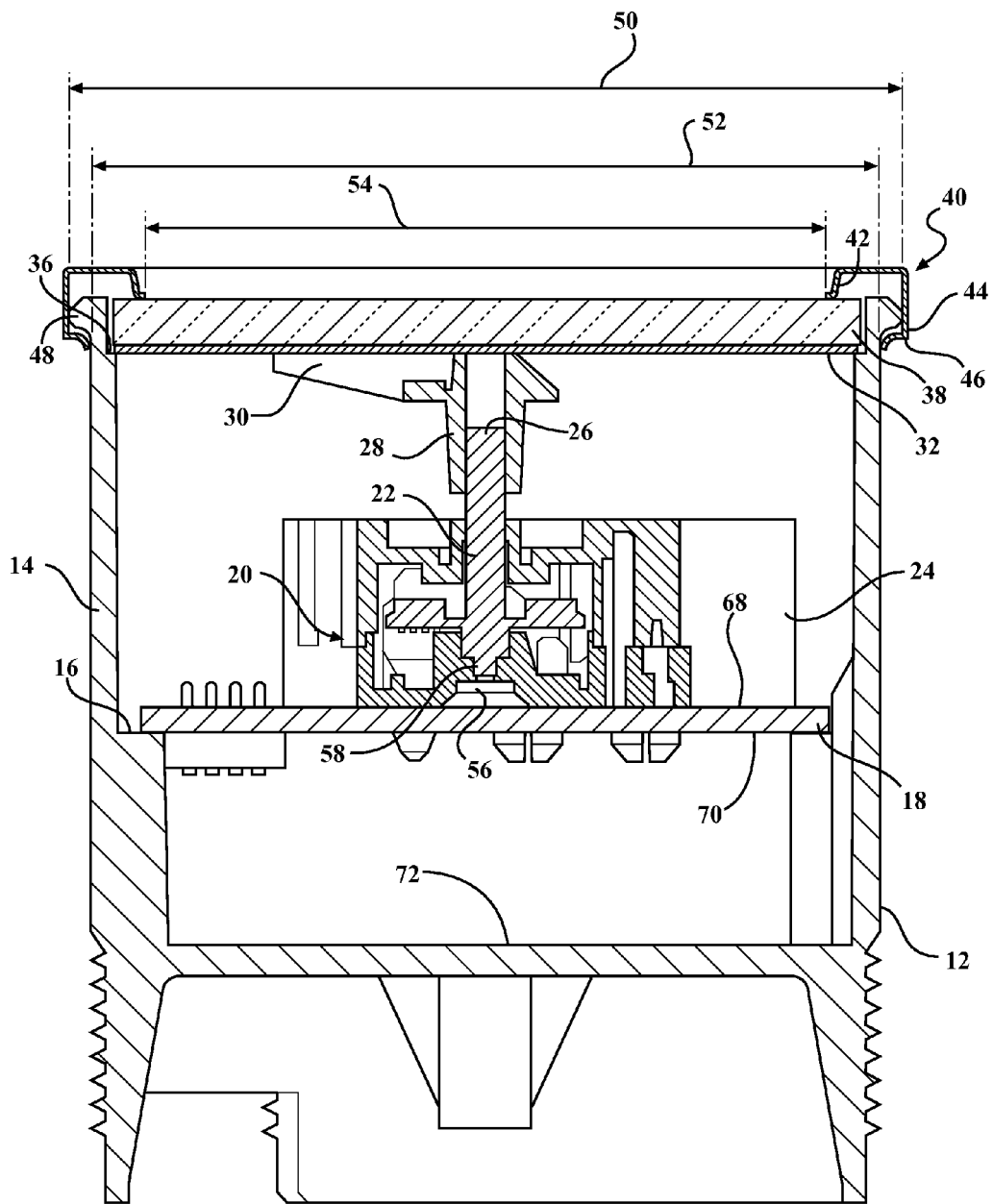
FIG. 1 is a sectional view of a gauge, according to embodiments of the present invention.

The housing 12 also includes an inner step portion 36, and the dial 32 is mounted on the inner step portion 36, as shown in FIG. 1. The lens 38 is positioned in the housing 12 on top of the dial 32 such that light projecting from the prism 30 penetrates through the dial 32 and the lens 38. The lens 38 and the dial 32 are secured to the inner step portion 36 by a bezel, shown generally at 40. The bezel 40 has a first flange portion 42 integrally formed with a body portion 44, and a second flange portion 46, which is also integrally formed with the body portion 44. During assembly, the first flange portion 42 and second flange portion 46 are deformed, or "crimped," to the shape shown in FIG. 1, to attach the bezel 40 to the housing 12. Formed as part of the housing 12 is an outer lip portion 48, and the second flange portion 46 is deformed such that the diameter 50 of the outer lip portion 48 is larger than the innermost diameter 52 of the second flange portion 46. The deformation of the flange portions 42,46 and the difference in size between the two diameters 50,52 provides for a secure connection between the bezel 40 and the housing 12, and prevents the bezel 40 from becoming detached from the housing 12. The secure connection between the bezel 40 and the housing 12 also secures the location of the dial 32 and the lens 38.

In the embodiment shown in FIGS. 1-4, the prism 30 and the tube portion 28 are integrally formed as a single component. However, it is within the scope of the invention that the prism 30 and tube portion 28 may be formed separately, and connected together during assembly. The prism 30 protrudes outwardly away from the tube portion 28 towards the outer diameter 54 of the dial 32. The end 26 of the shaft 22 partially extends into the tube portion 28. Disposed on the PCB 18 is a light source, which in this embodiment is a light emitting diode (LED) 56. A lower end 58 of the shaft 22 receives light from the LED 56, and the light is transferred through the shaft 22 towards the prism 30.

Figure 2A:
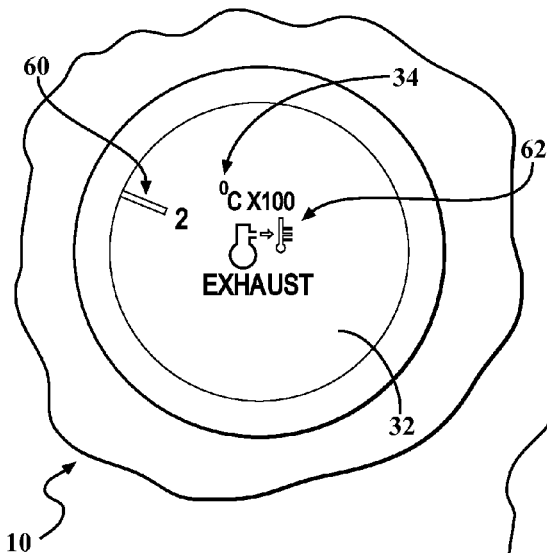
FIG. 2A is a first front view of a gauge, according to embodiments of the present invention.
Figure 2B:
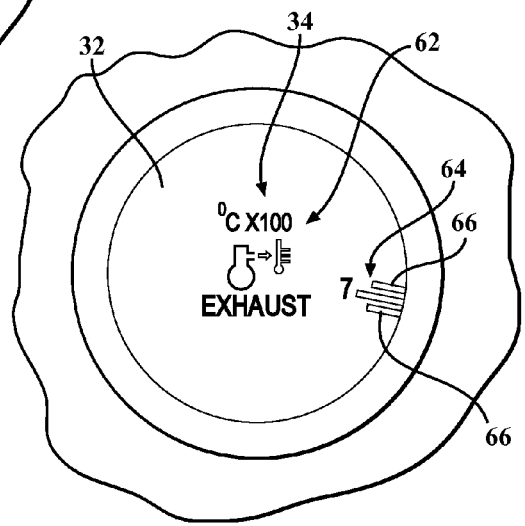
FIG. 2B is a second front view of a gauge, according to embodiments of the present invention.

The light passing out of the shaft 22 enters the tube portion 28, where a portion of the light passes out of the tube portion 28 towards the dial 32, and a portion of the light passes through the prism 30. The prism 30 directs light outwardly towards the dial 32. The portion of the dial 32 that is illuminated by the light projecting from the prism 30 varies, depending upon the position of the prism 30. Referring to FIGS. 2A and 2B, different portions of the dial 32 are shown as being illuminated. In FIG. 2A, a first graphic, shown generally at 60, is shown illuminated, along with a center graphic or icon, shown generally at 62, and the remaining portions of the dial 32 are dark, essentially having a "dead front" appearance. In FIG. 2, a second graphic, shown generally at 64, is shown illuminated, along with the center graphic 62. The first graphic 60 is illuminated as shown in FIG. 2A when the prism 30 is positioned behind the area of the dial 32 where the first graphic 60 is located, and the second graphic 62 is illuminated as shown in FIG. 2B when the prism 30 is positioned behind the area of the dial 32 where the second graphic 62 is located. When the prism 30 is aligned with one of the graphics 60,64, that graphic 60,64 is illuminated. There are also other various graphics which are located on the dial 32 that allow light to project through, which are illuminated when the prism 30 is in proper alignment with that particular graphic.

Additionally, the center graphic 62 is constantly illuminated when the LED 56 is illuminated. This is a result of the light from the LED 56 passing through the shaft 22 and through the tube portion 28 to illuminate the center graphic 62. The center graphic 62 remains in constant illumination because the area of the tube portion 28 being in alignment with the center graphic 62. The area of the tube portion 28 which projects light remains in alignment with the center graphic 62 regardless of how the prism 30 is rotated by the shaft 22. This results in the center graphic 62 remaining in constant illumination regardless of the position of the prism 30 or which area of the dial 32 is being illuminated.

The gauge 10 of the present invention allows for viewing a correct reading at almost any viewing angle relative to the lens 38. The illumination of only one of the graphics 60,64, and the alignment of the prism 30 behind the dial 32 ensures that only one reading is taken from the gauge 10, and there is no confusion when looking at the gauge 10 from different angles. The addition of the center graphic or icon 62 also provides for the gauge 10 to have additional functionality. The center graphic 62 is used as an indicator of what type parameter the gauge 10 provides, such as temperature or pressure. However, the center graphic 62 of the gauge 10 could also be used for other purposes, such as a warning indicator.

Referring again to FIG. 2B, the second graphic 64 also includes warning graphics 66, which are also illuminated to provide an indication that the reading provided by the gauge 10 indicates that an operating parameter has reached an undesired or unsafe operating condition. For example, the second graphic 64 shown in FIG. 2B indicates that exhaust temperature has reached an undesirable level. In various other embodiments, the dial 32 may be changed to have different graphics 60,64, such that the gauge 10 may be used to provide a reading for other operating conditions.

Figure 5:
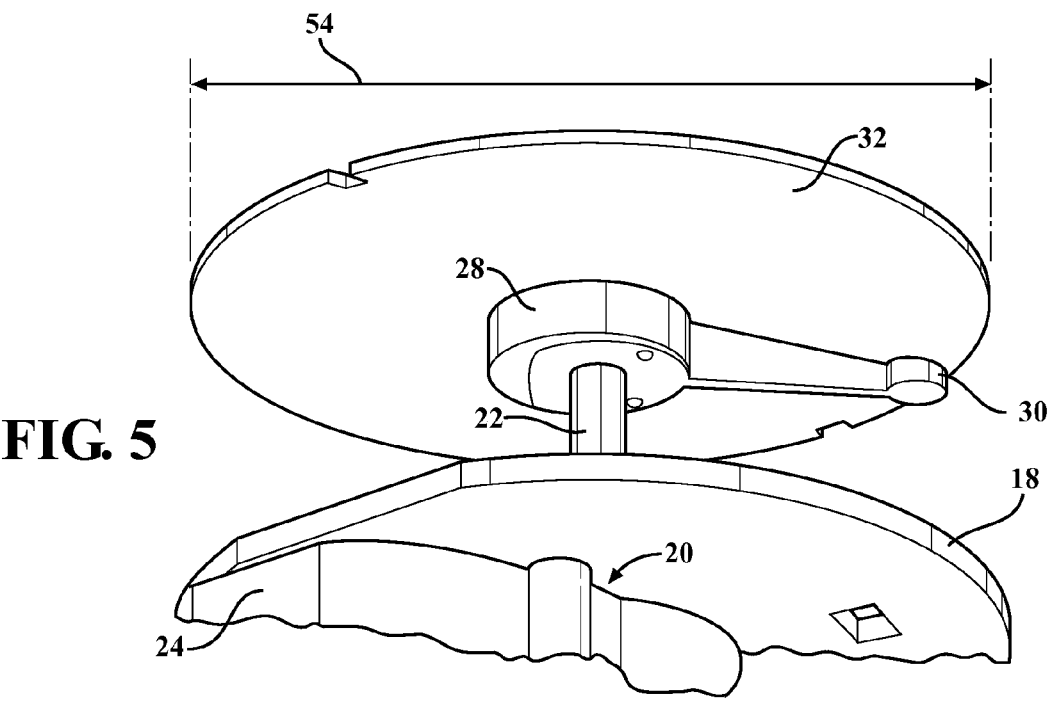
FIG. 5 is a perspective view of an alternate embodiment of a gauge with the housing removed, according to embodiments of the present invention.
Figure 6:
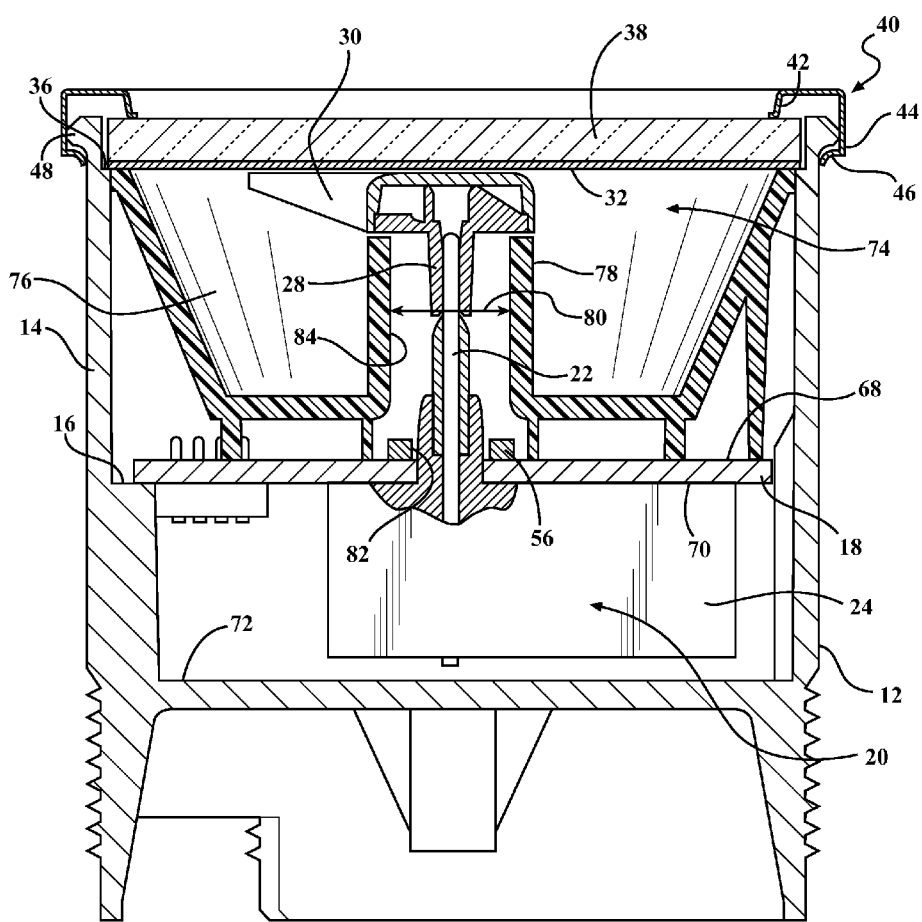
FIG. 6 is a sectional view of an alternate embodiment of a gauge, according to embodiments of the present invention.

In the embodiment shown in FIGS. 1-4, the stepper motor 20 is shown as being mounted on a top surface 68 of the PCB 18, such that the stepper motor 20 is located between the PCB and the dial 32. An alternate embodiment of the invention is shown in FIGS. 5-6, with like numbers referring to like elements. In this embodiment, the stepper motor 20 is shown mounted on a bottom surface 70 of the PCB 18, such that the stepper motor 20 is located between the bottom surface 70 and a lower wall 72 of the housing 12. In the embodiment shown in FIG. 5, the LED 56 is still located on the top surface 68 of the PCB 18, but the LED 56 in this embodiment is round and includes an aperture 82, and the shaft 22 extends through the aperture 82, as shown in FIG. 6.

Also included in this embodiment is a reflector, shown generally at 74, mounted to top surface 68 of the PCB 18. The reflector 74 includes a reflective surface 76 and a cylindrical portion 78. The cylindrical portion 78 is hollow, and has an inner diameter 80 which is larger than the diameter of the tube portion 28. The inside surface 84 of the cylindrical portion 78 is also reflective, and directs light from the LED 56 towards the tube portion 28 and the prism 30, such that the prism 30 and tube portion 28 direct light outwardly through the dial 32 and the lens 38.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
   a gauge, including:
      a light source;
      a light directing device operable for directing light from the light source;
      a dial located in proximity to the light directing device; and
      a plurality of graphics located on the dial, the plurality of graphics representing a plurality of measurements of an operating parameter;
      a housing, the dial mounted within the housing;
      a printed circuit board (PCB) located in the housing;
      an actuator connected to the printed circuit board; and
      a shaft extending through the actuator;
      a tube portion mounted on an end of the shaft, the light directing device connected to the tube portion;
      a center graphic located on the dial, the center graphic being part of the plurality of graphics;
      wherein the light directing device directs light through one of the plurality of graphics to indicate that the vehicle is operating at one of the plurality of measurements of the operating parameter, the actuator rotates the shaft such that the light directing device rotates and is positioned to direct light through the one of the plurality of graphics, such that the one of the plurality of graphics is illuminated, and the center graphic is constantly illuminated by light from the light source.

2. The apparatus of claim 1, further comprising:
   a lens mounted in the housing adjacent the dial; and
   a bezel connected to the housing, the bezel maintaining the position of the lens in the housing.

3. The apparatus of claim 1, the plurality of graphics further comprising:
   a first graphic located on the dial, the first graphic representing a first measurement of the operating parameter; and
   a second graphic located on the dial, the second graphic representing a second measurement of the operating parameter;
   wherein the light directing device is positioned in proximity to the first graphic to illuminate the first graphic, and the light directing device is positioned in proximity to the second graphic to illuminate the second graphic.

4. The apparatus of claim 1, the light directing device further comprising a prism.

5. A gauge, comprising:
   a housing;
   an actuator located within the housing;
   a light directing device movable within the housing, the movement of the light directing device controlled by the actuator;
   a dial mounted within the housing in proximity to the light directing device;
   a light source, the light directing device directs light from the light source through the dial;
   a plurality of graphics located on the dial such that light directed through the dial from the light directing device illuminates one of the plurality of graphics;
   a shaft connected to the actuator such that the shaft extends away from the actuator towards the dial;
   a tube portion mounted on an end of the shaft; and
   a center graphic located on the dial;
   wherein the light directing device further comprises a prism connected to the tube portion, and the light passing through the shaft also passes through the tube portion and the prism, such that the prism directs light through one of the plurality of graphics, depending upon the location of the prism, and the center graphic is illuminated by light passing through the tube portion, independently of the position of the prism.

6. The gauge of claim 5, further comprising:
   a printed circuit board (PCB) mounted in the housing, the actuator connected to the PCB;
   wherein the light source is mounted on the printed circuit board such that light from the light source passes through the shaft to the light directing device.

7. The gauge of claim 5, the plurality of graphics further comprising:
   a first graphic located on the dial representing a first measurement of the operating parameter; and
   a second graphic located on the dial representing a second measurement of the operating parameter;
   wherein the prism is positioned in proximity to the first graphic to illuminate the first graphic, and the prism is positioned in proximity to the second graphic to illuminate the second graphic.

8. A pointerless gauge, comprising:
   a housing;
   a printed circuit board (PCB) mounted within the housing;
   an actuator mounted on the PCB;
   a shaft extending through the actuator;
   an light emitting diode (LED) mounted on the PCB in proximity to the shaft, such that light passes through the shaft when the LED is activated;
   a tube portion mounted on an end of the shaft;
   a prism connected to the tube portion;
   a dial mounted in the housing in proximity to the prism;
   a plurality of graphics located on the dial, each of the plurality of graphics representing a measurement of an operating parameter; and
   a lens mounted in the housing in proximity to the dial such that the lens is on the opposite side of the dial in relation to the prism;
   wherein the actuator rotates the shaft to position the prism in proximity to one of the plurality of graphics representing a measurement of the operating parameter, and light emitted from the LED passes through the shaft and is directed through one of the plurality of graphics.

9. The pointerless gauge of claim 8, further comprising a bezel connected to the housing, securing the lens to the housing.

10. The pointerless gauge of claim 8, the plurality of graphics further comprising:
    a first graphic located on the dial representing a first measurement of the operating parameter;

a second graphic located on the dial representing a second measurement of the operating parameter; and a center graphic located in proximity to the center of the dial;

wherein the center graphic is constantly illuminated by the light passing through the shaft and the tube portion, and the first graphic and second graphic are selectively illuminated, depending upon the position of the prism.

11. The pointerless gauge of claim 8, wherein light from the LED passes through the shaft, through the tube portion, such that a portion of the light is directed through the dial by the prism, and a portion of the light is directed through the dial by the tube portion.

12. The pointerless gauge of claim 8, wherein the light directed from the prism passes through and illuminates one of the plurality of graphics, while the remainder of the dial has a dead front appearance.

* * * * *